Aug. 16, 1955 R. M. M. OBERMAN ET AL 2,715,724

CONVERTER FOR LINEAR AND BINARY CODES

Filed Oct. 29, 1951 5 Sheets-Sheet 1

INVENTORS:
ROELOF MAARTEN MARIE OBERMAN,
ANTONIE SNIJDERS.
BY Hugh A. Kirk
ATTY.

INVENTORS:
ROELOF MAARTEN MARIE OBERMAN,
ANTONIE SNIJDERS.
BY Hugh A. Kirk
ATTY.

INVENTORS:
ROELOF MAARTEN MARIE OBERMAN,
BY ANTONIE SNIJDERS.
Hugh A. Kirk
ATTY.

Aug. 16, 1955 R. M. M. OBERMAN ET AL 2,715,724

CONVERTER FOR LINEAR AND BINARY CODES

Filed Oct. 29, 1951 5 Sheets-Sheet 4

INVENTORS:
ROELOF MAARTEN MARIE OBERMAN,
ANTONIE SNIJDERS.
BY Hugh A. Kirk
ATTY.

CONVERTER FOR LINEAR AND BINARY CODES

INVENTORS:
ROELOF MAARTEN MARIE OBERMAN.
ANTONIE SNIJDERS.
BY Hugh A Kirk
ATTY

United States Patent Office 2,715,724

Patented Aug. 16, 1955

2,715,724

CONVERTER FOR LINEAR AND BINARY CODES

Roelof Maarten Marie Oberman and Antonie Snijders, The Hague, Netherlands, assignors to De Staat der Nederlanden, Ten Deze Vertegenwoordigd Door de Directeur-Generaal der Posterijen, Telegrafie en Telefonie, The Hague, Netherlands Application October 29, 1951, Serial No. 253,634

18 Claims. (Cl. 340—347)

This invention relates to a circuit arrangement for the conversion of linear codes into binary codes and vice versa. More particularly, it deals with a circuit for converting, by electronic means exclusively, a linear code comprising elements of different voltage levels into a binary code comprising a plurality of ordered signal elements, wherein each signal element corresponds to one of two electrical conditions.

Previously a similar arrangement for converting voltage linear codes into binary codes has been disclosed in Oberman United States Patent No. 2,543,050 in which relays are employed. However, owing to the slow operation of relays, such a relay arrangement is not applicable for use in electronic computing machines and in systems for pulse-code-modulation. Since the latter type systems require much faster operating devices than relays, they have previously employed either specially constructed electronic beam tubes (see Bell System Technical Journal for January 1948) or normal electron tubes in arrangements which involve a certain delay in obtaining the desired code-conversion.

It is an object of the present invention to provide a simple, stable, accurate, quick, effective, efficient and economic converter for linear and binary codes employing normal electron tubes, which converter is not subject to the delays involved in the previously known similar converter systems.

Another object is to provide such a converter system in which any number of code elements may be chosen and is not limited to a predetermined number of binary code elements, as is the case with a special electron beam tube.

Another object is to provide such a converter circuit in which the positioning velocity or speed of operation of the circuit is limited only by the inherent properties of the component parts of the circuits and not by any necessarily inserted delaying means for the proper operation of the circuit in a given sequence.

Another object is to provide such a converter circuit which remains in a stable condition after a given signal has been converted by it until the following signal is applied to the circuit for conversion.

Another object is to provide such a converter circuit which may be inverted, that is, it may be changed readily for the conversion of a binary code into a lineary code, from the circuit for the conversion of a linear code into a binary code.

Generally speaking, the arrangement according to the present invention comprises a series of similar switching devices, which series contains a separate switching device for each element of the binary code being converted. Each of these switching devices is composed of at least two electron tubes interconnected with each other to form a trigger circuit, so that only one tube of the pair is conductive at any one time. Between the anode circuits of each of the electron tubes of the pair in one device is a coupling resistance, the ohmic value of which coupling resistance varies in each device with respect to its adjacent device in the series according to a geometrical proportion. All of such coupling resistances are connected in series, thus connecting all of the switching devices in series and providing thereby a geometrically proportioned tapped potentiometer for the whole converter circuit.

Each of the switching devices is provided with a voltage divider or potentiometer, a tap from which is connected to the control grid of one of the pair of electron tubes of the trigger circuit. The voltage bias thus applied to the grid from such potentiometer determines what signal element or elements will operate that switching device, since the control grid of the other electron tube of the trigger circuit is connected to the input of the signal to be converted. Thus, if a linear code of signal elements having arithmetically proportioned different voltage levels or potentials, is to be converted to a binary code, each switching device is responsive, in a given combination, to a different voltage level, which combination corresponds also to the values of the series of coupling resistors connecting said switching devices. Similarly, if a binary code is to be converted into a linear code, the elements of the binary code are separately connected to each of the switching devices and the linear code is taken off from the potentiometer formed by the series of coupling resistances of the series of switching devices.

The energy for operating the converter circuit is derived from a direct current electrical source. Current stabilizing means are preferably provided for each switching device to stabilize the current flowing from the anodes to the cathodes, or the electron flow from the cathodes to the anodes of the pair of trigger tubes.

Each of the switching devices may also include an amplifier tube in order to steepen the leading and trailing edges of the characteristic curve of the signal applied to the trigger circuit. In the event the linear code to be converted contains signal voltages either too weak or too strong, i. e. just outside the range within which the trigger tubes have been made responsive, a special circuit may be added to the input for the linear code which will alternate each voltage signal within the responsive ranges of the trigger tubes, to insure proper and exact operation of the proper corresponding switching device or devices for that signal. Such a circuit may also include a frequency generator, a timing circuit and/or a gating or clipping circuit, to supply the properly valved pulses of the desired voltage level or levels.

The linear code input for the converter circuit may be coupled to an additional circuit for maintaining each linear voltage signal in the converter circuit until the next linear voltage level signal element is applied to the circuit. Such a voltage stabilizing circuit may comprise a pentode tube and resistances which are connected across the coupling resistor potentiometer of all the switching devices.

The above mentioned and other features and objects of this invention and the manner of attaining them are given more specific disclosure in the following description of embodiments of this invention taken in conjunction with the accompanying drawings, wherein.

Figure 1:
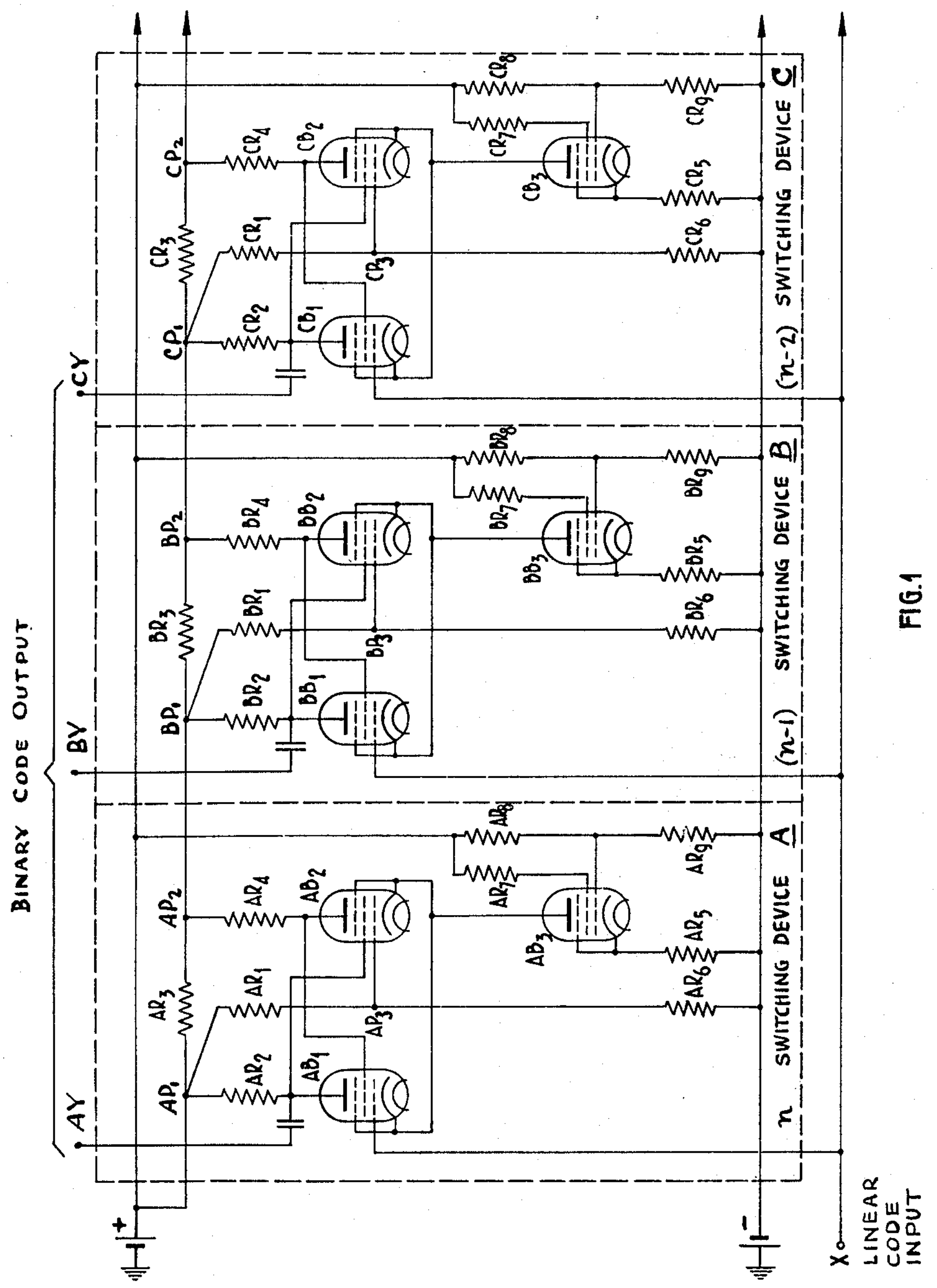
Fig. 1 is a wiring diagram of one embodiment of a converter according to the present invention with separate grid control showing the last three consecutive switching devices adapted for converting a linear code into a binary code.

Referring to the drawings, generally, there are shown converter circuits for converting a linear code having a plurality of elements (namely $2^n$ in number) of different nominal voltage or potential levels into a binary code having $n$ (number of) elements and vice versa wherein the switching devices disclosed correspond to the $n$, the $n-1$ and the $n-2$ elements of the binary code. Each of the switching devices is enclosed by a dash-line rectangular area and the circuit arrangement of each switching device for any one converter circuit or figure, is the same, except for the values of the resistances in each device. All the resistances are referred to by a reference character containing the letter "R." For convenience, each "$n$" switching device contains reference characters all of which commence with the letter "A," the $n-1$ switching device contains reference characters all commencing with "B," and the $n-2$ switching device contains reference characters commencing with "C." In any one figure or converter circuit, corresponding elements having the same function in each of the switching devices are given similar reference characters and numbers.

I.—LINEAR TO BINARY CODE CONVERTER WITH SEPARATE GRID CONTROL

1. *The apparatus.*—In the specific embodiment shown in Fig. 1 the linear code input signal is multipled from the terminal X to the control grid of each of the tubes AB1, BB1 and CB1 of the pair of trigger tubes —B1 and —B2 for each of the switching devices A, B and C. Since all of the switching devices A, B and C contain the same parts and elements, the remaining description will be directed to the switching device A. The control grid of the tube AB2 is connected between the resistances AR1 and AR6 forming a potentiometer or voltage divider, which is connected between the positive and negative terminals of the direct current voltage source for the circuit, herein indicated by the batteries connected to ground at the left side of Fig. 1. The resistances of the potentiometer resistors AR1 and AR6 have high ohmic values so that normally a positive voltage is maintained at the point AP3 of the control grids of the trigger tube AB2 with respect to the voltage on the control grids of the other trigger tube AB1, which is directly connected to the input terminal X when no signal is applied to terminal X. The cross connection between the screen grids and the anodes of the trigger tubes AB1 and AB2 forming the trigger circuit of the switching device A controls the trigger circuit so only one of the pair of trigger tubes is conductive at a time, and thus maintains the tube AB2 in the normally conductive condition, while the tube AB1 is normally in non-conductive condition. This condition exists for the trigger tubes of all of the switching devices A, B and C when no signal is applied at the terminal X.

The change over of the conductive condition of the trigger tubes AB1 and AB2, thus takes place when the control grid of the tube which is in non-conductive condition becomes more positive with respect to the control grid of that tube which is in conductive condition.

The anodes of the trigger tubes AB1 and AB2 are connected respectively to anode resistors AR2 and AR4 which are in turn connected respectively to the first and second terminals AP1 and AP2 of the switching device A. Between these first and second terminals AP1 and AP2 is connected a coupling resistor AR3 which has an ohmic resistance value with respect to the coupling resistors of the other switching devices adjacent to it, in proportion to the terms of a geometric progression to the ohmic values of the other coupling resistors —R3 in the whole converter circuit. For example, if there are $n$ elements in the binary code and correspondingly $n$ switching devices, the resistance —R3 of each of the devices have ratios with respect to each other of $2^n:2^{n-1}:2^{n-2}: \ldots 2^3:2^2:2^1$. As previously stated, all of the switching devices are connected in series through their coupling resistors —R3 so that the first terminal of one device is connected to the second terminal of the next device and so on through the whole series until the first terminal of the first device is connected directly to the positive pole of the direct current source, while the second terminal of the final switching device may be connected through a compensating resistance to the negative terminal of the current source in order to complete the circuit through the potentiometer formed by said coupling resistors, as is shown for resistor XR1 in Fig. 5 connected to the final terminal XP2 which will be described later.

For good functioning of the switching device circuit, the total current through each switching device must be constant under all circumstances. Therefore the cathodes of the triggering tubes AB1 and AB2 are connected together to a current stabilizing means, which may be a varistor or the anode of a pentode tube AB3 as shown in Fig. 1, the cathode of which pentode AB3 is connected through a resistance AR5 to the negative terminal of the current voltage supply for the circuit. The screen and control grid of the pentode AB3 may be connected between resistances AR8 and AR9 comprising a potentiometer.

In the conversion of a linear code to a binary code, means are provided to detect or indicate which of the two trigger tubes of each switching device are operated, such as the binary code output terminals AY, BY and CY connected through condensers to one (or both) of the anodes of said trigger tubes of each switching device. Such a connection would not affect the current flowing through the converter circuit.

2. *The operation.*—For the purposes of explanation, the triggering limits $V_p$ (see Fig. 2) of the tubes AB1, AB2, BB1, BB2, CB1 and CB2 shown in Fig. 1 are chosen to be successively at one volt intervals exactly so that for the three switching devices A, B and C disclosed in Fig. 1 there are eight stable combinations of conditions which may be taken as normal operating conditions corresponding to different signal elements of a linear code introduced at the terminal X, which now will be assumed to have values of 0 or ground potential, +1, +2, +3, +4, +5, +6, and +7 volts. The triggering limits therefore are chosen to have values between these nominal values so that the voltages of +½, +1½, +2½, +3½, +4½, +5½, and +6½ volts at the points —P3 of the signalling devices A, B and C are the critical voltages at which the tubes —B2 become non-conductive and are cut off from their normal conductive condition and the tubes —B1 become conductive.

Practically speaking, however, it is impossible to state that these triggering limits are met exactly, in that there always is a small threshold value $V_k$ of voltage which may occur on both sides of these limits at which the tubes may operate. For example, these values $V_k$ for the one volt range chosen may be + or −0.2 volt, which threshold values, however, will be neglected in the description of the operation which follows.

The potentiometers comprising resistors CR1 and CR2 of the $n-2$ switching device C normally bias the point CP3 to +½ volt, correspondingly the resistors BR1 and BR6 of the $n-1$ switching device B normally bias the point BP3 to 1½ volts, and correspondingly, resistors AR1 and AR6 of the $n$ switching device A normally bias the point AP3 to +3½ volts. Thus, the addition of any linear code voltage signal to the terminal X and the control grids of tubes CB1, BB1 and AB1 of the switching devices C, B and A, must be greater than the biased value of a selected switching device at its point —P3 in order to change the normal conductive condition of the trigger tubes of that device.

Assume first that the ground potential 0 volt is applied to terminal X for the first signal element of the linear code. Since the $n-2$ switching device C has a normal voltage bias at the point CP3 of +½ volt, and the voltages at the point BP3 and AP3 are even more positive, the signalling voltage of 0 volt does not change the condition of any of the trigger tubes in any one of the three switching devices, the tubes AB2, BB2 and CB2 thereby remaining in their normal conductive conditions.

Now, if $a$+1 volt signal is applied at the terminal X, this applies $a$+1 volt to the control grid of the tube CB1 which is a ½ volt higher or more positive than that of the +½ volt at the control grid of the tube CB2, so that the tube CB1 now becomes conductive and correspondingly tube CB2 becomes non-conductive, thus triggering the circuit of the pair of trigger tubes CB1 and CB2. This change over of the conductive condition of the two tubes CB1 and CB2 will not influence either of the other switching devices A and B, because of the equality of the anode currents through the tubes CB1 and CB2.

When the third signal element of +2 volts is applied to the terminal X, the tube BB1 is made conductive because the voltage of its grid is greater than that of +1½ volts at the point BP3. As soon as this occurs, the trigger tube BB2 is cut off so that more voltage is applied to point CP3 to bias the control grid of the tube CB2 on the preceding switching device circuit, which amounts to two more volts now biasing CP3 to +2½ volts. Similarly, the voltage at all the points —P3 of all other switching devices which may be connected to the right of the device B are increased by +2 volts. This raise in positive voltage for the point CP3 biases the control grid of tube CB2 more positive than the voltage now being applied to the control grid of trigger tube CB1, which is only +2 volts, so the condition of the switching device C also changes, the tube CB1 now becomes non-conductive again and the tube CB2 is again conductive.

An increase of the signalling voltage to +3 volts makes the conductive condition of the tubes CB1 and CB2 change over again, whereas the trigger tubes BB1 and BB2 remain in the same condition as for the signalling voltage of +2 volts. This is because the +3 volts signal does not affect switching device A biased to +3½ volts, but it does affect the switching device C which now is only biased to +2½ volts at the point CP3, so that the tube CB1 becomes conductive again and cuts off the conductivity of the tube CB2.

When the fifth +4 volts signal element of the linear code is applied to the terminal X, the signalling device A is finally operated, since the control grid of the tube AB2 is only biased to +3½ volts at the point AP3. Thus the tube AB1 now becomes conductive and the tube AB2 is cut off and becomes non-conductive. The non-conductivity of this tube AB2 accordingly affects through the coupling resistor potentiometer circuit connecting the terminals AP2 and BP1 and CP1, to increase the potential of the points BP3 and CP3 by an additional +2 volts so that these points respectively now have voltages of +5½ volts and +4½ volts. Therefore according to the +4 volt signal, only the tubes AB1, BB2 and CB2 are conductive.

In an analogous manner to that previously described, the tubes CB1 and CB2 alternate conductivity upon increasing the signalling voltage to +5, +6 and +7 volts, while maintaining the tube AB1 conductive for each of these signalling elements and altering of the conductivity of the tubes BB1 and BB2 only for the signalling element of +6 volts which alternation is maintained for the signal of +7 volts.

In order to illustrate the corresponding conductivities of the respective tubes of each of the switching device A, B and C shown in Fig. 1, reference is made to the following table for each of the linear code signal voltages of 0 to +7 volts.

*Table I*

| Linear Code Signal Voltages | Conductivity of Trigger Tubes and Biasing Voltages | | | | | | | | |
|---|---|---|---|---|---|---|---|---|---|
| | AB1 | AB2 | AP3 bias | BB1 | BB2 | BP3 bias | CB1 | CB2 | CP3 bias |
| 0 | ------ | x | +3½ | ------ | x | +1½ | ------ | x | +½ |
| +1 | ------ | x | +3½ | ------ | x | +1½ | x | ------ | +½ |
| +2 | ------ | x | +3½ | x | ------ | +1½ | ------ | x | +2½ |
| +3 | ------ | x | +3½ | x | ------ | +1½ | x | ------ | +2½ |
| +4 | x | ------ | +3½ | ------ | x | +5½ | ------ | x | +4½ |
| +5 | x | ------ | +3½ | ------ | x | +5½ | x | ------ | +4½ |
| +6 | x | ------ | +3½ | x | ------ | +5½ | ------ | x | +6½ |
| +7 | x | ------ | +3½ | x | ------ | +5½ | x | ------ | +6½ |

The fundamental arrangement of the circuit according to the converter of Fig. 1, is based on the fact that the cathode voltage of the trigger tubes AB1, AB2, BB1, BB2, CB1 and CB2 adapts itself to that tube of each pair which has the most positive control grid voltage. Thus, one tube of each pair of trigger tubes for each switching device is dependent upon the condition of the adjacent or preceding switching device, to its left as shown in Fig. 1, which tube indicates a whole series of standard voltages for the cooperating tube of the same pair to keep the current flowing or not flowing through the coupling resistors AR3, BR3 or CR3 for each of the switching device circuits.

According to the previous description, it can readily be predicted that by altering the value of the various resistances, the numbers of the switching devices may be extended at will by simply adding analogous switching devices to the right side of the circuit shown in Fig. 1 attached to the arrows at the end of the connecting conductors.

Also it is possible without departing from the scope of this invention to reciprocate the operation of the circuit shown in Fig. 1 wherein the normal voltage may be say 7 volts and the different linear code voltage elements may be decreased from 7 volts by one volt each so that the ground potential of 0 volt corresponds with the 7th nominal value of the signalling voltage.

II.—LINEAR TO BINARY CODE CONVERTER WITH COMBINED GRID CONTROL

Figure 3:
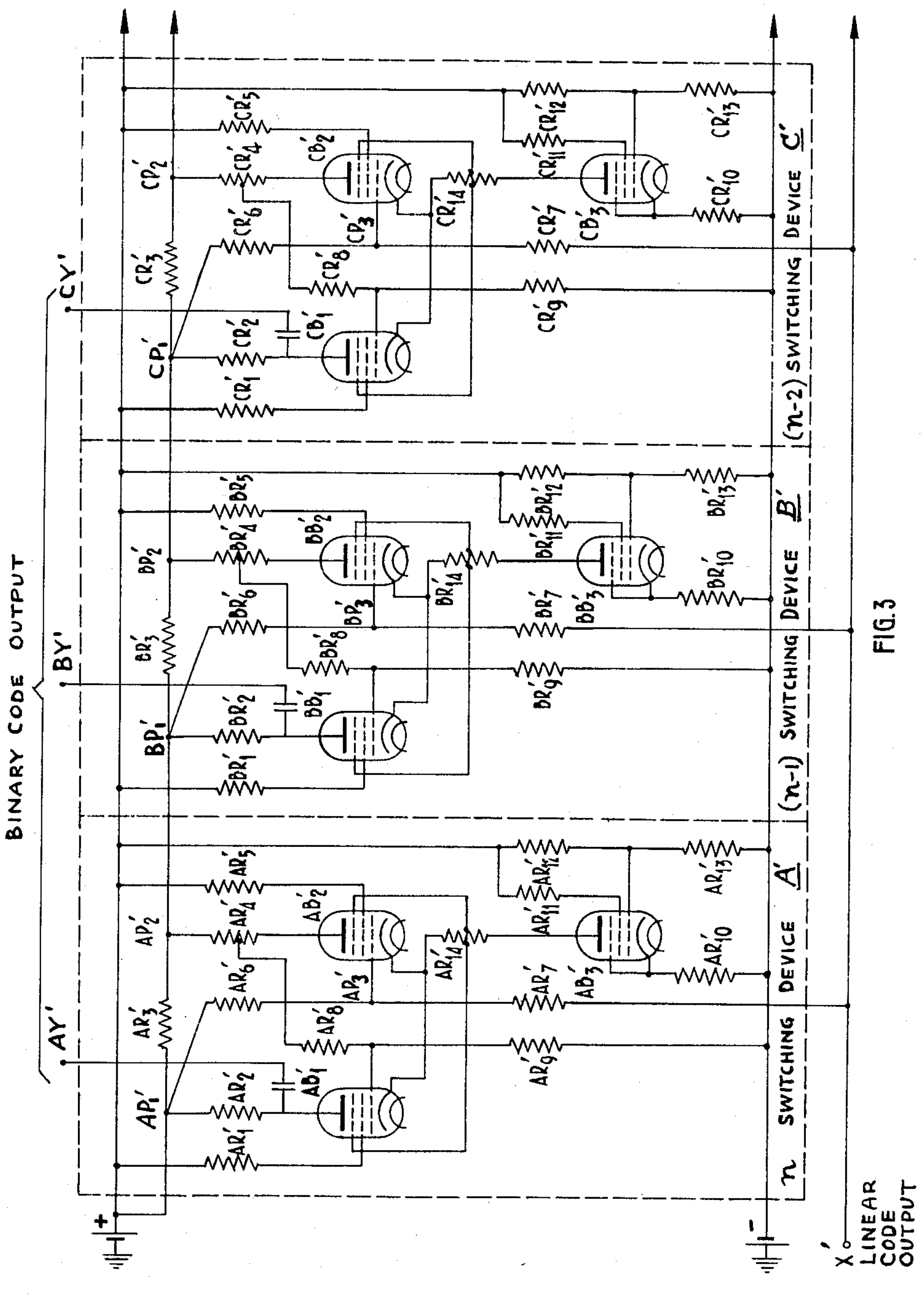
Fig. 3 is a wiring diagram of another embodiment of a converter with combined grid control showing the last three consecutive switching devices adapted for converting a linear code into a binary code.

1. *The apparatus.*—Another embodiment of a code converter circuit is shown in Fig. 3 which differs from the circuit shown in Fig. 1 by the fact that the linear input voltage elements are multiplied to the control grids of the second tubes AB2′, BB2′ and CB2′ of the pair of trigger tubes of each switching device over high ohmic resistances AR7′, BR7′ and CR7′, which control grids are also connected to the positive terminal of the direct current source for the converter circuit over additional high ohmic resistors AR6′, BR6′ and CR6′, respectively; while the linear control voltages for the circuits in Fig. 1 are directly connected to the control grids of the first of the pair of trigger tubes of each switching device. The control grid of the first tube of each switching device A′, B′ and C′, for example tube AB1′, is connected to a high ohmic potentiometer consisting of resistors AR8′ and AR9′ which is tapped from the anode resistor AR4′ of the second tube AB2′ of the trigger pair. This connection is made so that the tubes of each of the other switching devices B′ and C′ are cross connected so that one of the tubes will trigger the other and only one can be conductive at a time. Thus both the control grids of each of the pair of trigger tubes are connected to the anodes of the other tubes of the pair through resistances.

Similar to the circuit of Fig. 1, the cathodes of each of the pairs of triggering tubes AB1′ and AB2′ (and similarly for each switching device A′, B′ and C′) are connected together to a current stabilizing means, which in this case comprises in addition to a pentode tube AB3′ a potentiometer AR14′ in the anode circuit coupled to each of the cathodes of the tubes AB1′ and AB2′, which potentiometer AR14′ is tapped by conductors to the suppressors grids of each of the trigger tubes AB1′ and AB2′. This current stabilizing means accordingly insures the required equality of the anode currents for both of the trigger tubes of each of the switching devices according to the circuit arrangement for the switching devices A′, B′ and C′ of this embodiment.

Also as in the circuit in Fig. 1, there are the coupling resistors AR3′, BR3′ and CR3′ between the first and second terminals at AP1′, AP2′, BP1′, BP2′, CP1′ and CP2′, respectively, connecting the anodes of the trigger tubes of each of the switching devices, which coupling resistors vary in ohmic value with respect to each other according to geometric progression as previously stated, and which are connected together in series to form a potentiometer so that the second terminal of each of the intermediate switching devices is connected to the first terminal of the adjacent switching device, and the first terminal AP1′ of the last or n switching device A′ is connected to the positive pole of the voltage source.

The resistors AR6′ and AR7′ may be of equal ohmic value, and the corresponding resistors of each of the switching devices shown in Fig. 3, are of such high ohmic values, that any change in the signalling voltage applied to the linear code input terminal X′ does not affect the voltage at either the first or the second terminals AP1′ and AP2′ of any of the switching devices, nor does the change in the voltage along the series connected coupling resistors AR3′, BR3′ and CR3′ affect the signalling voltage.

2. *The operation.*—In the normal condition for the operation for the circuit shown in Fig. 3, the second of each of the pairs of trigger tubes for each of the switching devices, is normally in the conductive condition, that is, tubes AB2′, BB2′ and CB2′, while the first tubes AB1′ and BB1′ and CB1′ are normally in non-conductive condition. Therefore, the control grid of the first tube AB1′, for example, must be more positive with respect to the control grid of the second tube AB2′ before a change over in the conductivity of the tubes is obtained.

According to the present circuit, the threshold value for the trigger tubes is considered to be + or −0.5 volt, which is over twice the threshold value for the trigger tubes in the circuit shown in Fig. 1 described in section I2 above. Furthermore, for the circuit according to Fig. 3, the difference in the signal voltage must be greater than 0.5 volt in order to insure a change over operation or triggering of the pairs of tubes of each of the switching devices, but this change must be in the reverse sense, that is, of a decrease or negative voltage. Thus, when the control grid voltage of the first tube AB1′ is kept constant, by the means of the potentiometer comprising resistors AR8′ and AR9′ connected between the positive and negative terminals of the direct current source, the voltage signal which is applied to the control grid of the second tube AB2′ of the pair must accordingly be decreased by twice the threshold value of 0.5 volt, namely −1 volt. In the case of equal resistors AR6′ and AR7′ connected to opposite poles from the control grid of the second trigger tube AB2′, the signalling voltage has to be decreased by −2 volts in order to affect a change over of the conductivity between the pair of trigger tubes AB1′ and AB2′.

For the purposes of illustration, nominal values for the signalling voltage according to the linear code input signals will be considered at, 0 or ground potential, −2, −4, −6, −8, −10, −12 and −14 volts for each of the eight elements of the linear code applied to the terminal X′ when only three switching devices n, n−1 and n−2 corresponding to A′, B′ and C′ are disclosed as in Fig. 3. The theoretical triggering limits then at the points AP3′, BP3′ and CP3′ are thus accordingly varied or set to the voltages −1, −3, −5, −7, −9, −11 and −13 volts, respectively. However, for the following description of the operation of Fig. 3 the threshold value of + or −0.5 volt will be disregarded.

The change of the signalling voltage set from ground potential of 0 to −2 volts does not cause any changes in condition in the switching devices other than that of switching device C′, so that tube CB1′ becomes conductive while tube CB2′ becomes non-conductive, because of the voltage applied to the control grid of CB1′ is greater than the −1 volt charge at the point CP3 to the control grid of the tube CB2′. This change over the trigger tubes in switching device C does not affect any of the other switching devices disclosed in Fig. 3, in that only the three switching devices are now considered as a complete conversion circuit.

Further decrease of the signalling voltage to −4 volts causes the tube BB2′ of the switching device B to be changed to its non-conductive condition, and the tube BB1′ to its conductive condition. The control voltage of the tube BB1′ is positioned in such a manner by the resistors BR8′ and BR9′ that the control grid of the tube BB2′ at the −4 volts signalling voltage becomes ½ volt negative with respect to the control grid of the tube BP1′. In the normal condition, the control grid of the tube BB2′ is ½ volt positive with respect to that of control grid for tube BB1′. This change in the voltage at the control grid of the tube BB2′ also changes the voltage at the second terminal BP2′ of the device B′, which also becomes 4 volts more positive owing to the fact that the tube BB2′ is not now conductive. This 4 volts more positive change on the second terminal BP2′ changes the control voltage at the point CP3′ to the control grid of the tube CB2′ of the formerly operated switching device C. Thus, the control voltage at the point CB2′ returns to its normal conductive condition and the tube CB1′ to non-conductive condition.

The fourth linear code signalling voltage element of −6 volts does not cause any change in the conductive condition of the switching device B, but, the conductive condition of the trigger tubes in the signalling device C, changes again so that both first tubes BB1′ and CB1′ are now in conductive condition.

When the next signalling voltage of −8 volts is applied to the terminal X′, the n switching device C is brought into operation in which device the normal voltage on the control grid of second trigger tube AB2′ at point AP3′ is 3½ volts positive with respect to the control grid of the first trigger tube AB1′. Thus, the signalling voltage of −8 volts divided between equal resistors AR6′ and AR7′ produces a ½ volt more negative potential at the point AP3′ than at the control grid for the first tube AB1′ which changes the conductivity of the trigger tubes AB1′ and AB2′ so that the first tube AB1′ is conductive and the second tube AB2′ is cut off. In consequence of this change, the point AP3′ becomes 8 volts more positive so that the control grid voltage of the tubes BB2′ and BC2′ of the previously described switching circuits become 4 volts more positive than they were before. This causes the control grid of the tube BB2′ to become 1½ volts more positive with regard to that of the tube BB1′, and the control grid of the tube CB2′ to become ½ volt more positive with regard to that of the tube CB1′ thus changing the conductivity of the trigger circuit of both switching devices B′ and C′, with the tubes BB2′ and CB2′ again in conducting condition.

The linear code signalling voltage of −10 volts makes the tubes CB1′ return again to conducting condition, while the condition of the trigger tubes in the switching devices A and B remain unchanged to that just previously described, until the next code signalling voltage of −12 volts is applied to terminal X′, when the tubes of both switching circuits B and C, change from that previous just described condition. When the last or final linear signalling voltage of −14 volts is applied to the terminal X′, all of the first trigger tubes AB1′, BB1′ and CB1′ of the circuit are in conductive condition.

The relationship of the conductivity of these trigger tubes in the circuit just described in Fig. 3 is more fully illustrated in the following Table II; similar to Table I above:

*Table II*

| Linear Code Signal Voltages | Conductivity of Trigger Tubes | | | | | |
|---|---|---|---|---|---|---|
| | AB1′ | AB2′ | BB1′ | BB2′ | CB1′ | CB2′ |
| 0 | -------- | x | -------- | x | -------- | x |
| −2 | -------- | x | -------- | x | x | -------- |
| −4 | -------- | x | x | -------- | -------- | x |
| −6 | -------- | x | x | -------- | x | -------- |
| −8 | x | -------- | -------- | x | -------- | x |
| −10 | x | -------- | -------- | x | x | -------- |
| −12 | x | -------- | x | -------- | -------- | x |
| −14 | x | -------- | x | -------- | x | -------- |

It can be seen from the above Table II that the binary code corresponds identically with that of the binary code for the circuit of Fig. 1 for each of the respective different voltage level elements of the linear code being converted. Also the normal voltage level code may be chosen as −14 volts instead of 0 volts without departing from the scope of this invention.

Thus, according to the converter circuit of Fig. 3 it is possible to keep the control voltage to one of the trigger tubes for each of the switching devices constant and vary the voltage applied to the other tube to compare with this voltage, as distinguished from the direct variations in the voltages produced at the control grids of the second trigger tubes of each of the switching devices disclosed in the previously described embodiment of Fig. 1.

One advantage of the comparative or combined grid control circuit according to the converter of Fig. 3, over that disclosed in the converter circuit of Fig. 1, is that the triggering of the pairs of trigger tubes in each of the switching devices always takes place under the same conditions in the circuit of Fig. 3 since one of the tubes of each of the triggering devices is always biased at a constant voltage, and not an arbitrarily high cathode voltage of the trigger tubes. This enables the embodiment shown in Fig. 3 to function more stably and precisely than the converter circuit shown in Fig. 1. A disadvantage, however, of the converter circuit shown in Fig. 3 is that to obtain the same operation as in the circuit of Fig. 1 the signalling voltages of the arrangement according to Fig. 3 must be twice as high since a comparison is made; but this disadvantage, however, has less significance than the advantage of increased stability and precision which may be obtained by the circuit in Fig. 3.

III.—AMPLIFIED SWITCHING DEVICES

Figure 2:
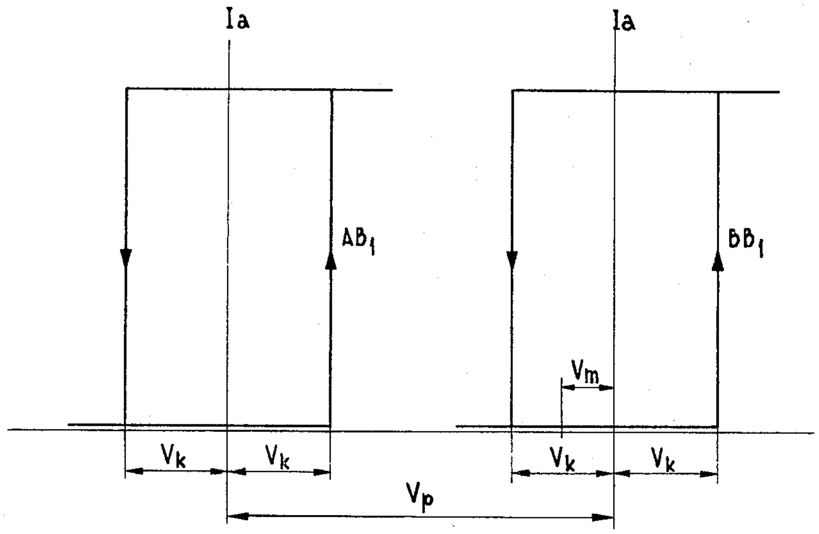
Fig. 2 is a graph of the voltage current characteristics for the tripping circuit of the trigger tubes of the switching devices of Fig. 1.

Since most commercial types of electron tubes have triggering characteristic curves that are not as sharp as those disclosed in the diagram of Fig. 2, that is with relatively perpendicular sides, auxiliary means may be provided to improve the sharpness of the characteristic curves, such as by amplification of the signals.

Figure 4:
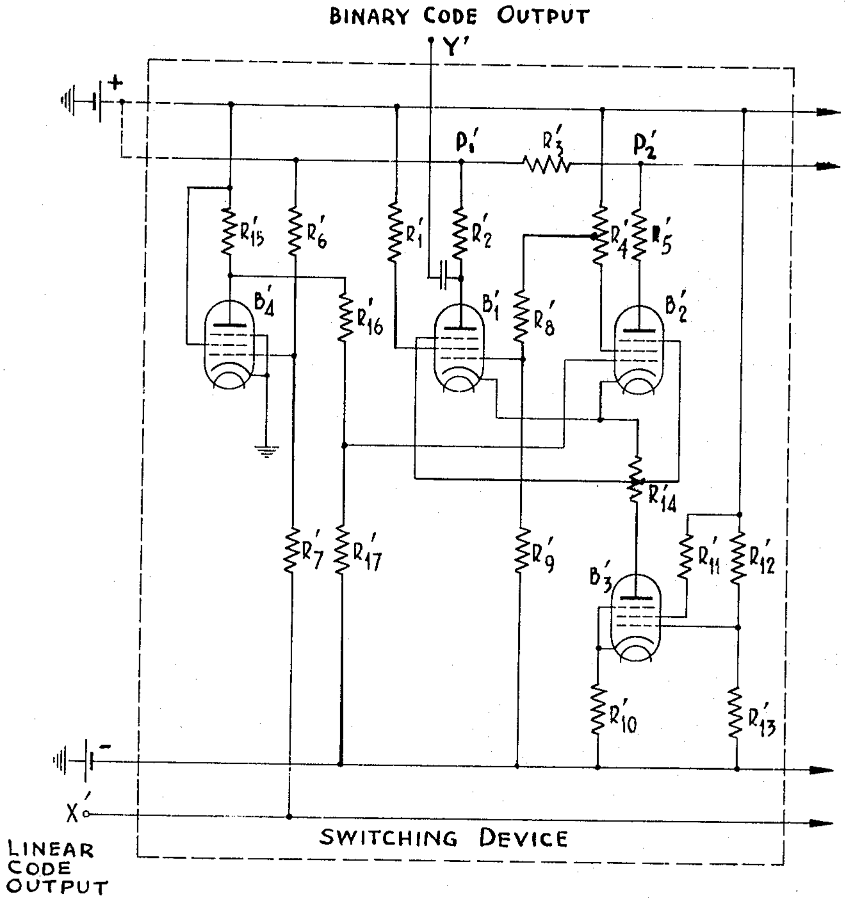
Fig. 4 is a wiring diagram of an amplified switching device circuit corresponding to the type of switching device circuit shown in Fig. 3.

In Fig. 4 there is shown a switching device circuit of the type described in Fig. 3 which has connected therewith an amplifier tube B4′, the control grid of which tube is connected between the high resistors R6′ and R7′, which resistors formerly were connected to either side of the control grid of the second trigger tube AB2′. The signal passed through these resistors R6′ and R7′ thus is amplified with its output from the anode from the tube B4′ being connected to one end of a potentiometer comprising resistors R16′ and R17′, between which resistors R16′ and R17′ the control grid of the trigger tube B2′ is connected. The cathode of the amplifier tube B4′ is connected to ground, while the anode is connected through a resistor R15′ to the positive terminal of the direct current source.

When applying the amplified switching device as disclosed in Fig. 4 to one of the switching devices shown in Fig. 3, or adapting the amplifier for the circuit of a switching device according to Fig. 1, a characteristic curve for the triggering tubes of the switching devices approaches more that of the sharp characteristic curves disclosed in Fig. 2.

IV.—VOLTAGE STABILIZATION CIRCUIT FOR CONVERTER

One of the most important features of this invention is to insure that the linear code voltage elements or the binary code elements at the input terminals to the converter circuit of the present invention are sufficiently accurate and stable to produce accurate converted signals which easily may be detected. There are two important ways which may be used separately or together for insuring the proper operation of the switching devices of the code converting circuits described in this invention which comprise additional circuits attached to the input terminals X or X′ of the circuits shown in Fig. 1 or Fig. 3, respectively. One such circuit may comprise a frequency generator and the other may comprise a signal retaining circuit.

1. *Frequency generator.*—As previously described in connection with the curves shown in Fig. 2, the triggering limit may vary for the circuit of Fig. 1 + or − 0.2 volt and for the circuit in Fig. 3 + or − 0.5 volt. Due to these threshold values for the trigger tubes of the switching devices the amplitude of a signalling voltage element from the linear code element could have passed a triggering limit of one of the switching devices without changing its condition, because the amplitude of the signalling voltage, though passing through the converter circuit, such as in Fig. 1, either remains under or over one of the threshold values lying at both sides of the triggering limit. In such a case a wrong code would be scanned from the binary output terminals Y or Y′.

In order to prevent such a situation, means may be connected to the input terminal X or X′ by which all of the signalling voltage elements supplied to this input terminal are each correspondingly increased and decreased in magnitude successively and periodically an amount not greater than that of the threshold value $Vk$ of the trigger tubes. Thus an alternating current or a pulsating current may be supplied to each of the linear voltages from a known type frequency generator. The amplitudes of such an alternating current are thus algebraically added to the signalling voltages, which in the examples of the circuit of Fig. 1 would be less than about + or − .2 volt, and of the circuits of Fig. 3 would be less than about + or − 0.5 volt. This alternating current should have a frequency of at least equal to $1/T$, where T represents the periodical time interval during which the signalling terminal X or X′ is controlled by the linear signalling voltage element.

Accordingly, this arrangement may be applied to pulse-code-modulation systems. In such systems, the amplitude of each signal current is at a certain moment scanned as to size, such as by a gating circuit, and then may be converted into a binary code of a certain number of elements by the converter circuit of the present invention. For example, a code of seven more or less elements may be used to convert speech frequency waves of normal commercial telephony into a series of binary code elements or pulses, instantaneously and continuously.

On the other hand if the signalling voltage has such a value that the signal control grid of the pair of trigger tubes is just equal to the bias on the control grid of the other tube of the pair, the conductive condition of the trigger tubes will remain unchanged when that signalling voltage is changed an amount + and − $Vk$ successively (see Fig. 2) the "threshold value" for these tubes and the limits of variations applied to the signalling voltages. Thus, the condition of all the switching elements is stable so long as the signalling voltage does not increase or decrease by an amount exceeding this threshold value V*k*. On the other hand, when the signalling voltage is lower than the theoretical comparison voltage by an amount, say V*m* as shown in Fig.2, and when the tube BB1 is conductive, then by decreasing the signalling voltage an amount V*k*, a change over of the tube BB1 will occur so that it will become non-conductive because the voltage applied to the tube BB1 has now decreased below the lower theshold limit, or left vertical line limit shown for time BB1 in Fig. 2. If the tube BB1 is non-conductive when the signalling voltage occurs at the level V*m* below the theoretical comparative voltage, then neither the addition nor subtraction of a voltage amounting to V*k* to this signalling voltage will cause any change in the conductivity of the tube BB1, since a + V*k* voltage to the V*m* value still will not surpass the right side vertical line of the threshold V*k* for the tube BB1 as shown in Fig. 2, and the tube BB1 will remain non-conductive.

Similarly, if the signalling voltage occurs between the central theoretical comparative voltage, indicated by the vertical line I*a* for tube BB1 in Fig. 2, and the right vertical line a distance V*k* to the right of said line I*a*, and if the tube BB1 is non-conductive, the application of + and — V*k* voltages to such a signalling voltage will surpass the right vertical line so that the tube BB1 will become conductive; and if the tube BB1 is already conductive, the application of either + or — V*k* to said signalling voltage will not cause any change in the conductivity of the tube BB1, because the —V*k* voltage applied to said signalling voltage will not traverse the left side vertical line for the tube BB1 shown in Fig. 2.

Thus, by employing both + and — V*k* voltage variations to each of the signalling voltage during the time it is applied to the tubes —B1 or —B2 in the circuits of Figs. 1 and 3, respectively, and the signalling voltage is below or to the left of the theoretical threshold limit for that tube, then that tube will always be cut-off or made non-conductive; and if the signalling voltage is above or to the right of the theoretical threshold limit for that tube, the tube will always be fired or remain conductive. In any event, however, these variations applied to the signalling voltages must be applied before the tubes —B1 and/or —B2 are scanned by the output circuit from the code converter.

Another and simpler way of producing the same accurate response to different signal volage levels, may be obtained by either only increasing or only decreasing each of the signalling voltages applied to the tubes —B1 and/or —B2 by an amount not more than twice the threshold voltage value V*k*. That is, either adding to each of the signalling voltages +2 V*k* volts, or subtracting from each of the signalling voltages —2 V*k* volts. In this manner any signalling voltage which would lie between the right and left threshold limits for tube BB1 as shown in Fig. 2 would either always cause the tube to become conductive if a +2 V*k* voltage were added, or would always cause the tube to be non-conductive, if a —2 V*k* voltage were applied to the signal. By adding such a constant double voltage to each of the signals a more rapid voltage stabilization can be obtained than if both positive and negative V*k* volts would have to be applied to each signal each time a signal was placed on the input to the circuit of this invention.

Accordingly, by having a threshold range of + and — V*k* or twice the value V*k* (that is, +2V*k* or —2V*k*), a stability may be obtained for the connected circuit which enables the operation of a switching device only when the signalling voltage comes within the given range of + and — V*k* of the value set for the switching device, so that any other linear voltage signal not coming within this threshold range will not cause the operation of that particular switching device.

It may be essential that between successive scanning time intervals for each of the linear code elements applied to the input terminals X or X′, that the condition of the voltage of each of these elements will be maintained in the circuit until the next succeeding code element is applied to the terminal X or X′. An example of such an auxiliary circuit which maintains this voltage condition is now described in the next section.

Figure 5:
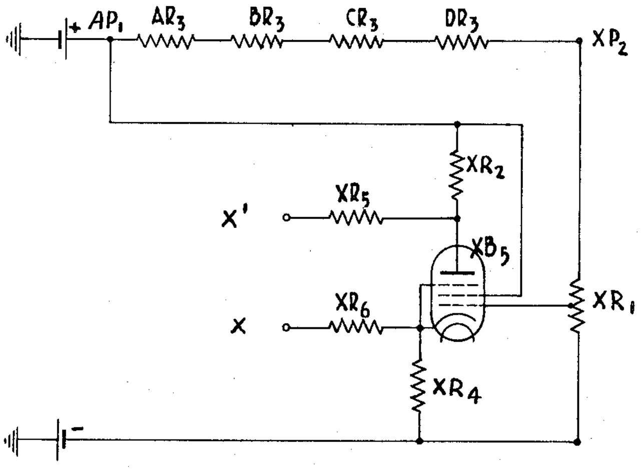
Fig. 5 is a wiring diagram of a signal voltage stabilization circuit which may be connected to the linear code input of the converter circuit shown in either Fig. 1 or Fig. 3.

2. *Voltage maintaining circuit.*—By the connection of a circuit similar to that shown in Fig. 5 to a terminal X or X′ as indicated by the correspondingly identified terminals in this Figure, a voltage stability can be obtained for the converter circuit which enables the converter circuit to remain in the condition which corresponds to the linear code signal applied to the circuit even after its signalling voltages is removed from the signalling terminal X.

The particular arrangement shown in Fig. 5 comprises a phase converting electron tube XB5, which may be a pentode, which has its control grid connected to a tapping of a potentiometer XR1, the end terminals of which potentiometer are connected respectively to the negative voltage source and the second terminal XP2 of the last switching element along the series of coupling resistors AR3, BR3, CR3 and DR3 farthest away from the positive terminal of the current source. This connection XP2 for either of the converter circuits specifically shown in Fig. 1 or Fig. 3, would correspondingly be to the points CP2 and CP2′, respectively. The cathode of the tube XB5 is connected through a resistance XR4 to the negative voltage source while the anode is connected through a resistor XR2 to the positive voltage source for the circuit. The output terminals X and X′ of this voltage stabilization circuit are respectively connected through high ohmic resistors XR6 and XR5 to the cathode and the anode of the tube XP5. These two output terminals X and X′ correspond respectively to the previously described positive linear code signals applied to the circuit of Fig. 1, and the negative linear code signals applied to the circuit of Fig. 3.

The voltage variation at the second or right hand terminal AP2 of the *n*th coupling resistor AR3 for any converter circuit is proportional to the signalling voltage in $2^n$ discrete values of the signalling voltage provided by the series of coupling resistors AR3, BR3, CR3, etc. The voltage at the tapping point from the potentiometer XR1 thus changes in proportion to this voltage at the previously mentioned point AP2. By means of the phase converting tube XB5 a voltage is generated at the outlet terminal X or X′ via resistance XR6 or XR5 which is equal to the nominal value of the signalling voltage then applied to the terminal X or X1, thereby maintaining the desired voltage signal applied to the circuit until a different voltage signal is applied. Thus, the circuit shown in Fig. 5 gives back via the high ohmic resistances XR5 or XR6 a "holding voltage" which is equal to the nominal value of the signalling voltage for the code element of the linear code applied to its input terminal.

V.—BINARY TO LINEAR CODE CONVERTER

Figure 6:
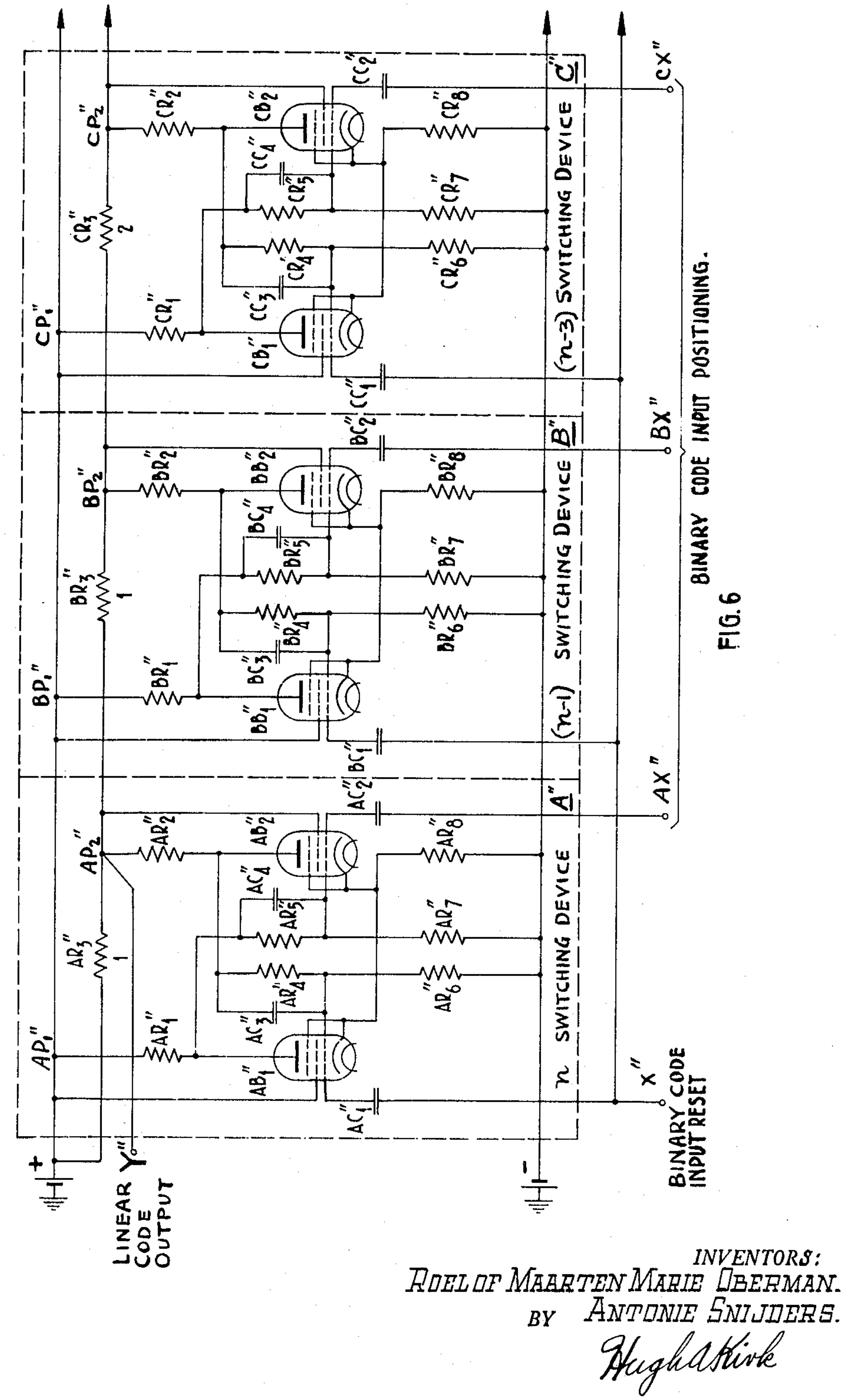
Fig. 6 is a wiring diagram of a code converter circuit showing the consecutive switching devices, which circuit is adapted for the conversion of a binary code into a linear code.

As mentioned in the previous section with regard to the description of the voltage stabilizing circuit in Fig. 5, the variations of the voltage at the second terminal AP2 of the *n*th switching device correspond with the variations in the linear voltages applied to linear code converting circuits of Fig. 1 or 3. This principle may also be applied for the reproduction of the converting of a binary code through the switching elements according to this invention into a linear code having elements of different potential levels. Such a circuit is shown in Fig. 6 in which the binary code is applied between the input reset terminal X″ and one of the other input positioning terminals AX″ or BX″ or CX″ depending upon which combination is employed in the particular code signal being converted. The rest terminal X″ is multipled to the control grids of the first of the trigger tubes AB1″, BB1″ and CB1″, while the separate terminals AX″, and BX″ and CX″ are respectively connected to the control grids of the second trigger tubes AB2″, BB2″ and and CB2″ of each of the switching devices A″, B″ and C″. The anodes of each of the —B2″ triggering tubes of each of the switching devices A″, B″ and C″, are correspondingly connected to the terminals of the coupling resistors AR3″, BR3″ and CR3″, which coupling resistors are connected together in series, as previously described, forming a potentiometer circuit. While on the other hand, the anodes of the —B1″ triggering tubes may be connected to a common positive potential source through the multiple connections P1″.

As the voltage impulses of the binary code are supplied to trigger one or more of the second tubes AB2″, BB2″ and CB2″, the amount of voltage which is conducted through the coupling resistors AR3″, BR3″ and CR3″ is correspondingly varied at the point AP2″. After the selected second trigger tubes are fired for each binary code signal, the circuit is reset by an impulse applied to the reset terminal X″ so that the next binary code signal will set up a different sequence of trigger tubes corresponding to that signal.

According to the circuits shown in Figs. 1 and 3 the anode current of each of the switching devices passes through the coupling resistors AR3, BR3, CR3 etc. of all the preceding switching devices so that a given effect is obtained on the circuit of a preceding or adjacent switching device. However, according to the present circuit for the conversion of a binary code into a linear code, the coupling resistors —R3″ may be so chosen that no such effect occurs, assuming that the currents from all of the trigger tubes being conductive in the different switching devices A″, B″ and C″ are the same. Thus, the coupling resistors AR3″, BR3″ and CR3″ have to be chosen in the relationships with respect to each other of 1:1:2:4:8 . . . $2^{n-2}$. This relationship also is a geometric progression, although different from that for tre coupling resistors described in the converter circuits Figs. 1 and 3, and further differing in that the lowest valued resistor of the series is directly connected to the positive terminal of the voltage source, while in Figs. 1 and 3 the highest valued resistor of the series is connected directly to the positive terminal.

Thus a circuit employing the essential features of a series of coupling resistors having a geometric proportional ratio with respect to each other, a series of similar or identical switching devices comprising a pair of triggering tubes which are biased to predetermined voltages, are common features for all the converter circuits disclosed in this invention, either for converting a binary code into a linear code or a linear code into a binary code.

While there is described above the principles of this invention in connection with specific apparatus, it is to be clearly understood that this description is made only by way of example and not as a limitation to the scope of this invention.

What is claimed is:

1. A static circuit for interconverting linear voltage and binary codes comprising: a series connection of successively geometrically proportioned resistors corresponding in number to the elements of the binary code, a number of switching devices corresponding to each resistor, each switching device comprising a pair of crosswise coupled electron discharge tubes each having an anode of at least one tube, the anodes of each pair of said tubes being connected to the resistor corresponding to that device, separate voltage divider circuits for each device providing a given bias to the control grid of at least one of said pair of tubes to aid in controlling the operation of said switching devices, a linear voltage code connection multipled to each device, and a plurality of binary code connections corresponding to each device.

2. A circuit according to claim 1 wherein each of said tubes have control grids and said linear voltage code connection is multipled to the control grids of one of the tubes of each said device, and the anodes of both tubes of each pair are connected across the resistor corresponding to that device.

3. A circuit according to claim 1 wherein said linear code connection is connected to said series of resistors.

4. A circuit according to claim 1 including a signalling voltage stabilizing circuit connected to the linear code connection and to said series of resistors.

5. A circuit according to claim 1 including a plurality of current stabilizing means corresponding to each of said switching devices, and each said means being connected to both of said pair of tubes of each said device.

6. A circuit according to claim 1 including both a signalling voltage stabilizing circuit connected to said linear code connection and to said series of resistors, and a plurality of current stabilizing means corresponding to each of said devices.

7. A circuit according to claim 1 including a plurality of amplifiers corresponding to each of said devices.

8. A circuit for converting a linear code of different signalling voltage elements into a binary code of $n$ elements and vice versa, comprising: a series connection of $n$ coupling resistors having ohmic values proportional to the terms of a geometric progression, $n$ switching devices connected to and corresponding with each of said coupling resistors to produce a potential through the connected coupling resistor corresponding to a control voltage of a linear code element, means for connecting the signalling voltages of the code to be converted to each of said switching devices to bias the operation of said switching devices relative to the values of said coupling resistors, and means connected to said switching devices for removing the code which has been converted.

9. A circuit arrangement for the conversion of different signalling voltages into a binary code of $n$ elements and vice versa, comprising: $n$ switching devices each having a first terminal, a second terminal, a coupling resistor interconnecting both said terminals, and a pair of electron discharge tubes crosswise coupled to form a trigger circuit, said tubes each having a cathode, an anode and a control grid; a current source having a positive and a negative pole; means for connecting the cathodes of said tubes to said negative pole of said current source; resistance means individual to each of the switching devices connected to the anodes of each pair of said tubes and in a circuit to said positive pole of said current source through a corresponding one of said terminals, conductors connecting the first and second terminals of successive switching devices and connecting the first terminal of the first switching device to the positive pole of said current source; means for biasing the grids of one of each pair of said tubes of each said devices, means for coupling the grids of the other of each pair of said tubes with signalling voltages; and means responsive to the conductive condition of said pairs of tubes of all of said switching devices effected by said signalling voltages for determining the converted code.

10. A circuit according to claim 9 wherein the values of said coupling resistors are in a ratio with respect to each other according to the terms of the geometric progression $2^n:2^{n-1}; \ldots 2^3:2^2:2^1$.

11. A circuit according to claim 9 wherein each of said means for coupling said grids includes a resistor.

12. A circuit according to claim 9 including a signalling voltage stabilizing means comprising a phase converting tube connected to both said interconnected coupling resistors and said signalling voltages to be converted.

13. A circuit for converting different signalling voltages into a binary code of $n$ element, comprising: $n$ switching devices each having a first terminal, a second terminal, a coupling resistor connected between said terminals, and a pair of tubes crosswise coupled forming a trigger circuit, each of said tubes comprising an anode connected to a corresponding one of the two terminals and a control grid; a current source having a positive pole and a negative pole; anode resistors individual to each of said switching devices connecting the anodes of said pair of tubes respectively to said first and said second terminals; conductors through connecting the first and second terminals of successive switching devices and connecting the first terminal of the first switching device to the positive pole of said current source; a signalling terminal at which the signalling voltage is applied; means for connecting the signalling terminal to the control grids of one tube of each pair of said tubes; and resistor means connecting one terminal of each switching device in the control grid of the tube corresponding to the other terminal of each switching device, whereby a binary code is represented by the conductive condition of the tubes of each said pair in succession, which condition is controlled by the signalling voltage connected to said signalling terminal.

14. A circuit according to claim 13 including means for varying the signalling voltage applied to said signalling terminal by an amount of at the most to twice the threshold value of said tubes of said switching devices, in the interval during which the signalling voltage is applied to said signalling terminal.

15. A circuit according to claim 13 wherein said coupling resistors of the successive switching devices have a ratio with respect to each other of $2^n:2^{n-1}:2^{n-2}: \ldots 2^3:2^2:1^1$.

16. A circuit according to claim 13 including a current stabilizing means for each said device connected to both tubes of said pair of tubes of that device.

17. A circuit for converting a binary code having $n$ elements into the linear code having different signalling voltages having a total of $2^n$ values which values form an arithmetic linear progression, comprising: $n$ switching device each having a first terminal, a second terminal, a coupling resistor interconnecting said terminals, and a pair of electron discharge tubes coupled crosswise forming trigger circuits, each of said tubes having an anode, a current supply source having a positive pole and a negative pole; anode resistors connecting the anodes of said first and said second tubes of each said switching device, respectively, to the positive pole of said supply source and to said second terminals; conductors through connecting the first and second terminals of successive switching devices; $n$ input conductors connected with the control grids of corresponding tubes of successive switching devices for controlling them in accordance with said binary codes; an auxiliary input conductor multiplied to the control grids of the other of said pair of tubes of each of said switching device for resetting said trigger circuits to their normal condition; and a signalling terminal connected through said second terminal of the $n$ switching device for the output of said signalling voltages.

18. A circuit according to claim 17 wherein said coupling resistors individual, to the successive switching devices have ohmic resistance ratios in a geometric progression corresponding to $2^0:2^1:2^2:2^3 \ldots 2^{n-4}: 2^{n-3}: 2^{n-2}$.

References Cited in the file of this patent

UNITED STATES PATENTS

| | | |
|---|---|---|
| 2,453,454 | Norwine | Nov. 9, 1948 |
| 2,530,538 | Rack | Nov. 21, 1950 |
| 2,539,623 | Heising | Jan. 20, 1951 |
| 2,556,200 | Lesti | June 12, 1951 |
| 2,568,724 | Earp | Sept. 25, 1951 |
| 2,570,221 | Earp | Oct. 9, 1951 |
| 2,576,099 | Bray | Nov. 27, 1951 |